No. 892,953. PATENTED JULY 7, 1908.
W. B. HAMPTON.
CHECK ROW ATTACHMENT.
APPLICATION FILED FEB. 27, 1908.
3 SHEETS—SHEET 1.
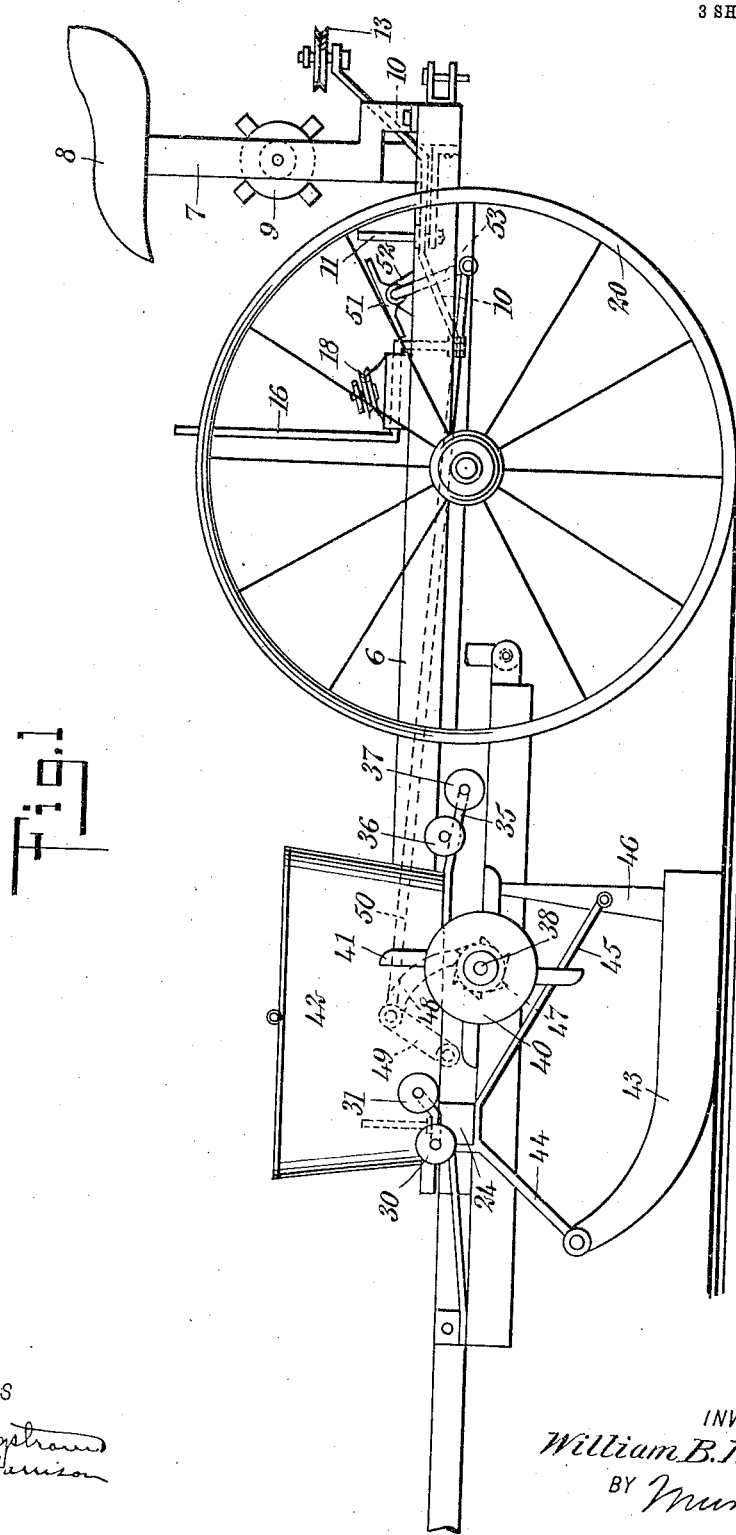
WITNESSES
Johna Bergstrom
Walton Harrison
INVENTOR
William B. Hampton
BY Munn & Co
ATTORNEYS.

No. 892,953. PATENTED JULY 7, 1908.
W. B. HAMPTON.
CHECK ROW ATTACHMENT.
APPLICATION FILED FEB. 27, 1908.
3 SHEETS—SHEET 2.
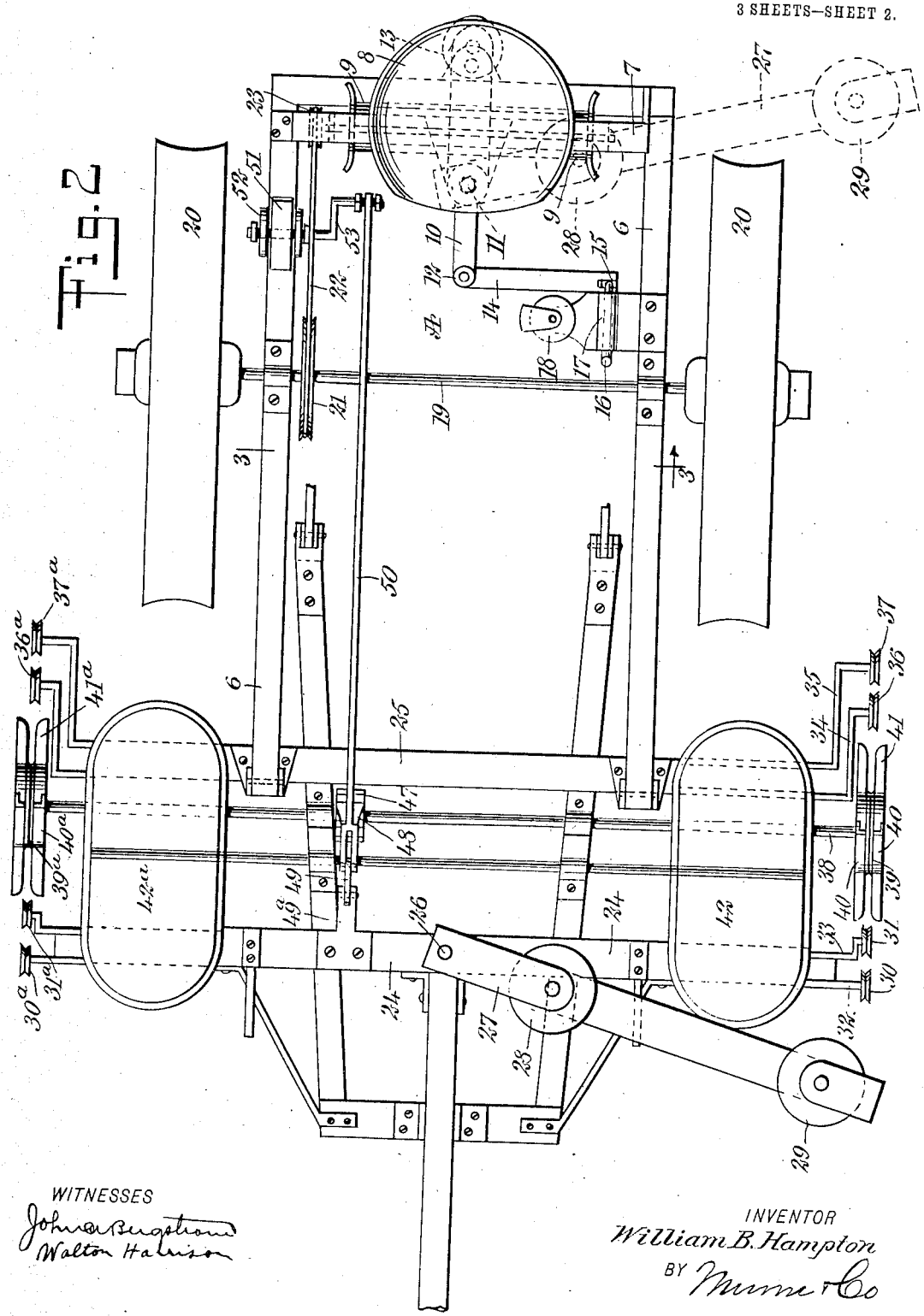
WITNESSES
INVENTOR
William B. Hampton
BY Munn & Co
ATTORNEYS No. 892,953. PATENTED JULY 7, 1908.
W. B. HAMPTON.
CHECK ROW ATTACHMENT.
APPLICATION FILED FEB. 27, 1908.
3 SHEETS—SHEET 3.
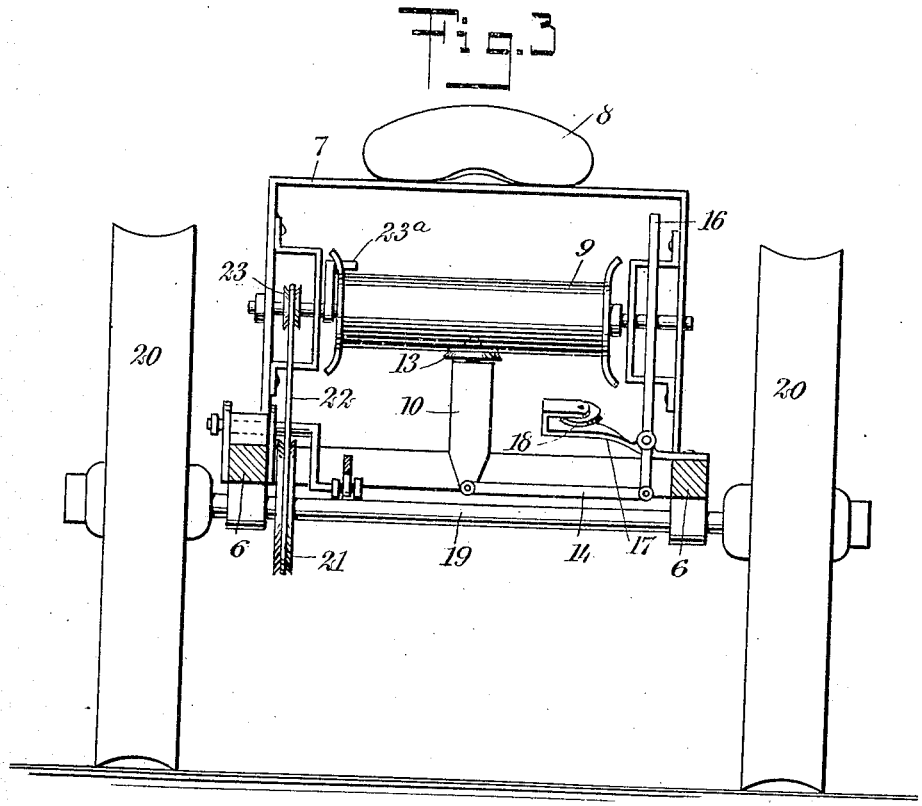
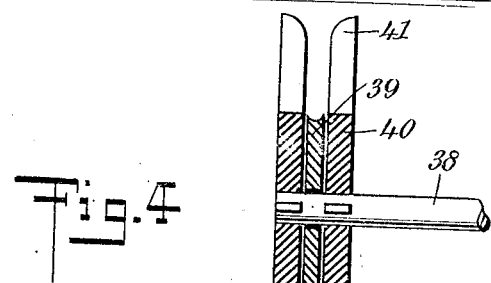
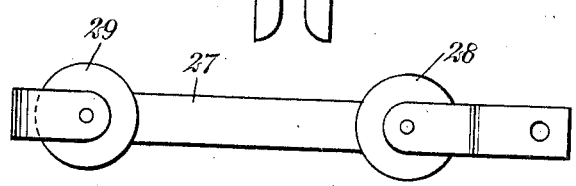
WITNESSES
INVENTOR
William B. Hampton
BY
ATTORNEYS.

UNITED STATES PATENT OFFICE.

WILLIAM B. HAMPTON, OF FREMONT, MISSOURI.

CHECK-ROW ATTACHMENT.

No. 892,953.

Specification of Letters Patent.

Patented July 7, 1908.

Original application filed July 2, 1907, Serial No. 381,830. Divided and this application filed February 27, 1908. Serial No. 418,049.

*To all whom it may concern:*

Be it known that I, WILLIAM B. HAMPTON, a citizen of the United States, and a resident of Fremont, in the county of Carter and State of Missouri, have invented a new and Improved Check-Row Attachment, of which the following is a full, clear, and exact description.

My invention relates to planting machinery, my more particular object being to produce a check row attachment for use in connection with a planter for the purpose of paying out or taking in a wire, as the case may be, as the planter moves along.

This application is a division of my former application filed July 2, 1907, and resulting in Patent No. 883,014, dated March 24, 1908.

It will be understood in this connection that in plowing and seeding a field it is frequently desirable to stretch a wire when the work begins, and when the field is practically finished it is equally desirable to take up the wire. I provide a device for this purpose and combine it with a planter, in such manner that at the beginning of the work in any particular field the wire may be stretched by the work of the planter at the time when the planter is moving along performing its normal duty, whereas, toward the finish of the work upon the field the attachment, operated by the planter, takes up the wire without interfering with the service ordinarily performed by the planter.

While the attachment admits of general use upon planters and analogous machinery, it is of peculiar value in relation to planters adapted for planting corn, peas, or the like, from seed boxes carried by the movable mechanism.

My invention makes provision, among other things, for guiding the check row wire, the mechanism for this purpose being completely under control of the operator while the planter is in motion. This is accomplished in such manner that when the check row is rendered inactive, the dropping of the seeds is absolutely controllable at will, as well as when the check row wire is active. The check row attachment can be used in connection with planters in such manner as to check row or drill such small seeds as those of broom corn, sugar cane and the like.

Reference is to be had to the accompanying drawings forming a part of this specification, in which similar characters of reference indicate corresponding parts in all the figures.

Figure 1 is a side elevation of a planter equipped with my attachment, this view showing particularly the attachment of the wheels for guiding the check row wire; Fig. 2 is a plan view of the mechanism shown in Fig. 1, and discloses in addition the means for driving the reel employed for winding and unwinding the check row wire, and also the gearing for driving this reel by the rotation of the shaft; Fig. 3 is a transverse section upon the line 3—3 of Fig. 2, looking in the direction of the arrow and showing the reel and the gearing for turning the same by rotation of the axle; Fig. 4 is an enlarged sectional plan view of one of the check row wheels; and Fig. 5 is a front elevation of a reversible and detachable guide arm employed in connection with the attachment for guiding the wire.

Side beams are shown at 6 and are connected together by a bar 7 bent into rectangular form. Mounted upon this bar is a seat 8 below which is revolubly mounted a reel 9. A lever 10 is journaled upon a pin 11 which projects a little distance above it, as will be understood from Fig. 1. A pulley 13 is mounted upon the ends of the lever 10 and this lever is connected by a joint 12 and a pitman 14 with a lever 15 provided with a handle 16, this handle projecting upwardly. A bearing bracket is shown at 17 and supports the lever 15, and a guide wheel 18 is revolubly mounted upon the bearing bracket 17.

Journaled to the beams 6 is a revoluble axle 19, and mounted upon the latter are vehicle wheels 20 upon which most of the mechanism is supported. Secured rigidly upon the axle 19 is a pulley 21 which is connected by a belt 22 with a smaller pulley 23, the latter being in operative relation to the reel 9 by aid of a dog 23ª.

Cross beams are shown at 24, 25, the beam 25 being connected with the side beams 6, and a pivot pin 26 is mounted upon the cross beam 24. A guide arm 27 is detachably journaled upon the pin 26 and is swung upon the same as a center. This guide arm 27 may be swung to the right or to the left of the planter as desired. Mounted upon the guide arm 27 are guide wheels 28, 29. The guide arm may be lifted bodily off the pivot pin 26 and placed upon the pivot pin 11 for a purpose hereinafter described.

Guide wheels 30, 31 are mounted upon stationary shafts 32, 33, and are employed to guide the check row wire. Shafts 34, 35 support revoluble guide wheels 36, 37. A shaft 38 extends directly across the framework, and revolubly mounted upon it is a pulley 39. Disposed upon opposite sides of this pulley are disks 40, each provided with fingers 41, the disks being keyed rigidly upon the shaft 38 and arranged as indicated in Fig. 4, the pulley 39 being revoluble independently of the disks.

Seed boxes are shown at 42, 42$^a$, in Fig. 2. Adjacent to the seed boxes 42$^a$ are guide wheels 30$^a$, 31$^a$, 36$^a$, 37$^a$, a pulley 39$^a$, and disks 40$^a$, provided with fingers 41$^a$, these parts corresponding to the guide wheels 30, 31, 36, 37, 39, 40 and 41 upon the opposite side of the machine. Disposed beneath the seed boxes 42, 42$^a$ are runners or furrow openers 43 secured in position by braces 44, 45, and standards 46.

Mounted upon the shaft 38 is a ratchet wheel 47 engaged by a pawl 48, this pawl being mounted upon a link 49 which is journaled in a bracket 49$^a$ carried by the cross beam 24. A rod 50 is connected with the link 49 and is employed for actuating the pawl 48. A treadle 51 is mounted upon a bearing 52 and is connected with a crank 53 so that by operating the treadle 51 the rod 50 is moved forward or backward. The seed chutes, leading from the seed boxes 42, 42$^a$, being of the usual construction are omitted for the sake of clearness.

The operation of my device is as follows: The seed boxes are charged up with seed and the planter is drawn by animals, in the usual manner, into the field where the work is to be done. The work of the planter, as regards planting, its relation to disturbing the soil and planting the seeds, does not differ essentially from the action of any other planter. At the beginning of the work, however, or, in other words, when the first row in the field is started, a stake may be placed in the ground, and to this stake may be connected the end of a long wire which has previously been wound upon the reel 9. The wire, previous to its connection with the stake, is led straight out in a line and passed partially around the pulley 18, thence to pulleys 28 and 29 of the guide arm 27, this guide arm now being upon the front portion of the machine, as indicated by full lines in Fig. 2. The wire is thence brought into engagement with the guiding wheels 30, 31, 39, 36, 37, and from the wheel 37 it is carried to the stake and secured. The machine being driven forward in the usual manner, so that the work of planting proceeds, the wire is paid out and used as a check row wire.

Now, when the work of planting is about to be finished, the operator detaches the guide arm 27 from the pin 26, carries it to the rear of the machine and mounts it upon the pin 11, as indicated by dotted lines in Fig. 2. This is to enable the wire to be taken up. The machine is now brought into such position that the wire stretches out directly in front of the machine. The end of the wire is passed over the guide wheels 30, 31, 36, 37 and partially around the wheels 29, 13, to the reel 9. As the planter is driven forward, the rotation of the axle 19 causes the wheel 21 to drive the belt 22, and the latter by turning the pulley 23, turns the reel and this winds up the wire.

If desired, the operator, by working the treadle 51 and consequently moving the crank 53, so as to throw the rod 50 forward or backward, can turn the shaft 38 as desired.

From the above description it will be noted that my attachment, when used in connection with an ordinary planter, is employed for both the purpose of stretching a wire behind the machine and of taking up a wire previously stretched in front of the machine, the two operations being entirely distinctive and in no way affecting the usual work of the planter as such.

Having thus described my invention, I claim as new and desire to secure by Letters Patent:

1. The combination of a frame, a reel mounted thereupon, an axle for supporting said frame, means for turning said axle when said frame is moved along, a driving connection from said axle to said reel for the purpose of turning the latter, a shaft mounted upon said frame, check row wheels mounted upon said shaft, guiding wheels for directing a wire relatively to said check row wheels, and a shifting guide arm pivotally connected to said frame and provided with a member for guiding the wire.

2. The combination of a planter, a guide arm revolubly mounted thereupon, guide wheels carried by said guide arm, means for shifting said guide arm bodily in relation to the general framework, a reel for carrying wire, and means for guiding said wire from said reel to said guide wheels upon said guide arm.

3. The combination of a planter, a reel mounted thereupon, a guide arm separate from said planter and carried thereby, means for connecting said guide arm to separate portions of said planter, and a guiding member mounted upon said guide arm for directing the movements of a wire relatively to said reel.

In testimony whereof I have signed my name to this specification in the presence of two subscribing witnesses.

WILLIAM B. HAMPTON.

Witnesses:
J. G. JONES,
L. J. NORRIS.